United States Patent
Liang et al.

(10) Patent No.: US 11,216,058 B2
(45) Date of Patent: Jan. 4, 2022

(54) STORAGE SYSTEM DEEP IDLE POWER MODE

(71) Applicant: Micron Technology, Inc., Boise, ID (US)

(72) Inventors: Qing Liang, Boise, ID (US); Jonathan Scott Parry, Boise, ID (US)

(73) Assignee: Micron Technology, Inc., Boise, ID (US)

(*) Notice: Subject to any disclaimer, the term of this patent is extended or adjusted under 35 U.S.C. 154(b) by 142 days.

(21) Appl. No.: 16/511,490

(22) Filed: Jul. 15, 2019

(65) Prior Publication Data
US 2021/0018975 A1    Jan. 21, 2021

(51) Int. Cl.
*G06F 1/00*       (2006.01)
*G06F 1/3287*   (2019.01)
*G06F 1/28*       (2006.01)

(52) U.S. Cl.
CPC .............. *G06F 1/3287* (2013.01); *G06F 1/28* (2013.01)

(58) Field of Classification Search
CPC ........ G06F 1/3287; G06F 1/28; G06F 3/0625; G06F 3/0653; G06F 3/0659
See application file for complete search history.

(56) References Cited

U.S. PATENT DOCUMENTS

| 9,459,687 | B2 | 10/2016 | Park et al. |
| 9,922,684 | B2 * | 3/2018 | Pedersen ................ G11C 5/147 |
| 10,379,595 | B2 | 8/2019 | Stenfort |
| 2010/0067133 | A1 * | 3/2010 | Ooi ....................... G11B 19/042 360/31 |
| 2013/0166866 | A1 * | 6/2013 | Yerushalmi ........... G06F 1/3275 711/162 |
| 2015/0012671 | A1 * | 1/2015 | Park ....................... G11C 16/00 710/5 |
| 2016/0217823 | A1 * | 7/2016 | Arslan ................. G06F 11/1008 |
| 2016/0343416 | A1 * | 11/2016 | Chang ....................... G11C 5/14 |
| 2018/0059944 | A1 | 3/2018 | Helmick et al. |
| 2018/0121124 | A1 * | 5/2018 | Choi ..................... G06F 3/0659 |
| 2018/0321856 | A1 | 11/2018 | Jang |
| 2018/0364918 | A1 | 12/2018 | Jean |
| 2019/0034106 | A1 | 1/2019 | Shin et al. |
| 2019/0050048 | A1 * | 2/2019 | Kang .................... G06F 1/3275 |
| 2019/0179747 | A1 | 6/2019 | Kim |

* cited by examiner

*Primary Examiner* — Xuxing Chen
(74) *Attorney, Agent, or Firm* — Schwegman Lundberg & Woessner, P.A.

(57) ABSTRACT

Systems and methods are disclosed, including, after a first threshold time after entering an idle power mode of a storage system, without receiving a command from a host device over a communication interface, moving host data stored in volatile memory of the storage system to non-volatile memory of the storage system and transitioning a power mode of the storage system from an idle power mode to a deep idle power mode using control circuitry of the storage system, the deep idle power mode having a second power level lower than a first power level of the idle mode and a second exit latency higher than a first latency of the idle mode. The control circuitry can further determine that the storage system is ready to enter a power savings power mode and provide an indication of the determination using a unidirectional power state signal interface separate from the communication interface.

27 Claims, 6 Drawing Sheets

STORAGE SYSTEM DEEP IDLE POWER MODE

BACKGROUND

Memory devices are semiconductor circuits that provide electronic storage of data for a host system (e.g., a computer or other electronic device). Memory devices may be volatile or non-volatile. Volatile memory requires power to maintain data, and includes devices such as random-access memory (RAM), static random-access memory (SRAM), dynamic random-access memory (DRAM), or synchronous dynamic random-access memory (SDRAM), among others. Non-volatile memory can retain stored data when not powered, and includes devices such as flash memory, read-only memory (ROM), electrically erasable programmable ROM (EEPROM), erasable programmable ROM (EPROM), resistance variable memory, such as phase change random access memory (PCRAM), resistive random-access memory (RRAM), or other memory, such as magnetoresistive random access memory (MRAM), 3D Cross-Point (XPoint) memory, Ferro-electric memory (FeRAM), Phase-Change memory (PCM), among others.

Host systems (e.g., hosts) typically include a host processor, a first amount of host memory (e.g., main memory, often volatile memory, such as DRAM) to support the host processor, and one or more storage systems (e.g., often non-volatile memory, such as flash memory) that provide additional storage to retain data in addition to or separate from the main memory.

A storage system (e.g., a solid-state drive (SSD), a universal flash storage (UFS) device, etc.) can include a memory controller and one or more memory devices, including a number of (e.g., multiple) dies or logical units (LUNs). In certain examples, each die can include a number of memory arrays and peripheral circuitry thereon, such as die logic or a die processor. The memory controller can include interface circuitry configured to communicate with a host device (e.g., the host processor or interface circuitry) through a communication interface (e.g., a bidirectional parallel or serial communication interface). The memory controller can receive commands or operations from the host system in association with memory operations or instructions, such as read or write operations to transfer data (e.g., user data and associated integrity data, such as error data or address data, etc.) between the memory devices and the host device, erase operations to erase data from the memory devices, perform drive management operations (e.g., data migration, garbage collection, block retirement), etc.

Software (e.g., programs), instructions, operating systems (OS), and other data are typically stored on storage systems and accessed by main memory for use by the host processor. Main memory (e.g., RAM) is typically faster, more expensive, and a different type of memory device (e.g., volatile) than a majority of the memory devices of the storage system (e.g., non-volatile, such as an SSD, etc.). In addition to the main memory, host systems can include different forms of volatile memory, such as a group of static memory (e.g., a cache, often SRAM), often faster than the main memory, in certain examples, configured to operate at speeds close to or exceeding the speed of the host processor, but with lower density and higher cost.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
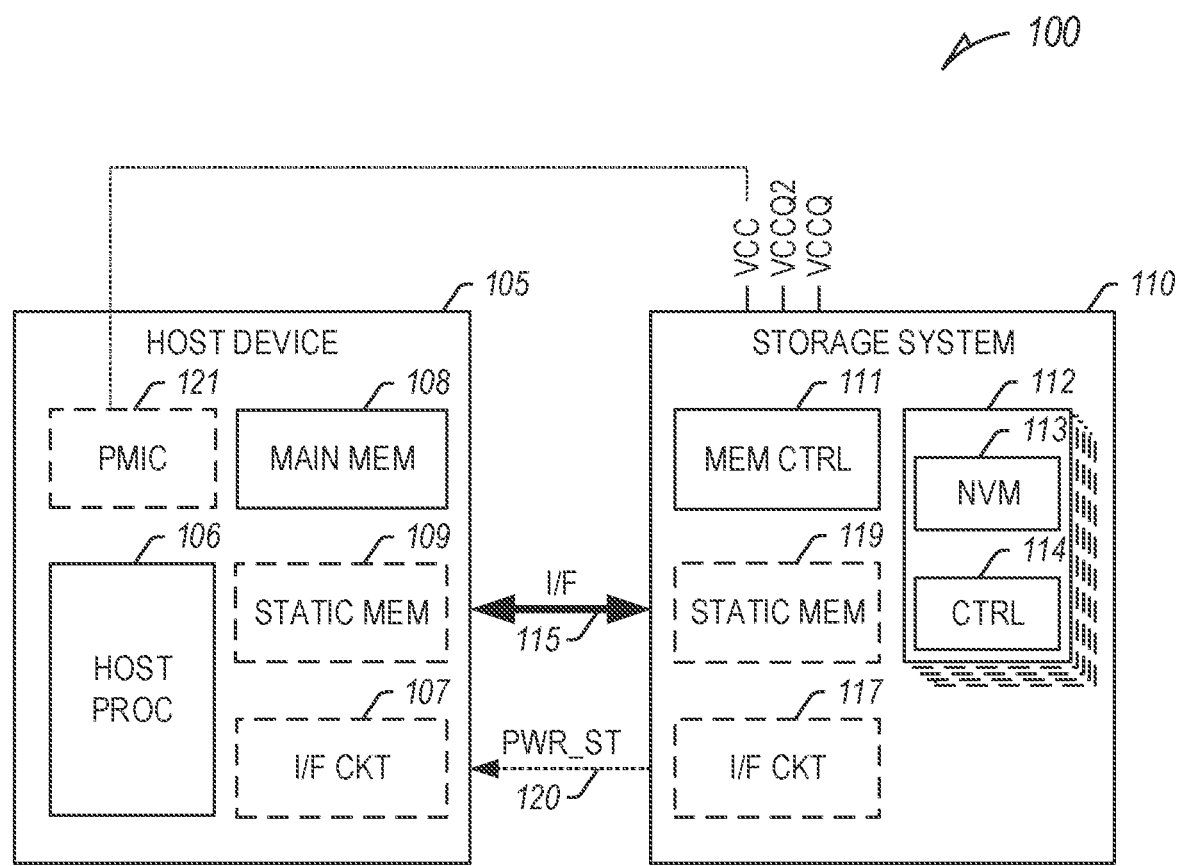
FIG. 1 illustrates an example host system including a host device and a storage system.

Modern host systems, including a host device, a storage system, and a communication interface, have different power modes, including, for example, Active, Idle, Pre-Active, Sleep, Pre-Sleep, PowerDown, and Pre-PowerDown power modes. In different non-Active power modes, various system resources can be powered down to save power. However, certain system resources must be maintained or otherwise managed, including different power levels, such as to maintain data in volatile memory or responsiveness to incoming commands, etc. In addition, many host systems share power rails throughout the host system, preventing power removal from the storage system alone, further limiting power savings.

For example, the host system may transition from the Active power mode to the Idle power mode at the completion of any command or background operation. However, power savings in the traditional Idle power mode are limited by responsiveness requirements of such mode; the receipt of any UFS Protocol Information Unit (UPIU) will transition the storage system into the Active power mode, and such system must be responsive to its receipt. After a first threshold amount of time in the Idle power mode (e.g., 5 seconds, etc.), the host system may transition to a power savings power mode, such as the Sleep power mode, etc., through the Active power mode, such as to synch volatile memory (e.g., cache, static memory, etc.) before entering the power savings mode. The Active power mode can be required to enable communication between the storage system and the host device, such that the storage system can provide an indication to the host device that the storage system or components thereof are ready to be placed in the power savings power mode, where VCC may be removed.

The present inventors have recognized, among other things, a Deep idle power mode, different than the traditional Idle power mode, configured to further reduce power consumption beyond that currently enabled in the Idle power mode. For example, after a second threshold amount of time in the idle power mode (e.g., 10 mS, 20 mS, 50 mS, etc., shorter than the first threshold), the storage system may transition to Deep Idle power mode. At the beginning of the Deep Idle power mode, the storage system can flush all cached host data into non-volatile memory (NVM) (e.g., NAND), such as using an automatic synchronize cache function of the storage system, etc., thereby reducing current requirements of the remaining first threshold time of the traditional Idle power mode.

Table 1, below, illustrates different storage system power modes, including Active, Idle, Deep Idle, and Sleep power modes, and different power requirements and exit latency associated therewith. For example, in the Active power mode: the communication interface is enabled (e.g., in a FAST state); ICCQ2 RMS Current, which is generally used to provide power to the communication interface, can require 200 mA of current; ICC RMS Current, which is generally used to power the one or more memory devices of the storage system, can require 60 uA of current; and Exit Latency is N/A, as Exit Latency generally refers to the time required to return to the Active power mode in response to a received command from the host device over the communication interface. In contrast, in the Idle power mode: the communication interface is in a hibernate state, a low-power mode still responsive to incoming commands from the host device; ICCQ2 RMS Current can require 33 mA of current; ICC RMS Current can require 60 uA of current; and Exit Latency, such as to the Active power mode from the Idle power mode, can be less than (but approximately) 100 uS. In the Sleep power mode (e.g., a power saving power mode): the communication interface is in the hibernate state; ICCQ2 RMS Current can require 320 uA of current (the storage system can be responsive to a smaller subset of commands in the Sleep power mode than in the Active and Idle power modes, and other commands may be terminated, such as described in one or more Joint Electron Device Engineering Council (JEDEC) UFS standards referenced below); ICC RMS Current can be N/A, as VCC is typically removed in the Sleep power mode; and Exit Latency, such as to the Active power mode from the Sleep power mode, can be less than (but approximately) 20 mS.

In the Deep Idle power mode, as recognized by the present inventors: the communication interface is in the hibernate state; ICCQ2 RMS Current can require 320 uA of current (the storage system can be responsive to a smaller subset of commands in the Deep Idle power mode than in the Active and Idle power modes, and other commands may be terminated, similar to that described for the Sleep power mode above), substantially less than that required by the Idle power mode; ICC RMS Current, which is generally used to power the one or more memory devices of the storage system, can require 60 uA of current; and Exit Latency, such as to the Active power mode from the Deep Idle power mode, can be less than (but approximately) 2 mS, more than the time required to exit from the Idle power mode, but substantially less than that required to exit the Sleep power mode.

TABLE 1

Power Modes

| UFS Power Mode | Active | Idle | Deep Idle | Sleep |
|---|---|---|---|---|
| UniPro Power Mode | FAST | Hibernate | Hibernate | Hibernate |
| ICCQ2 RMS Current | 200 mA | 33 mA | 320 uA | 320 uA |
| ICC RMS Current | 60 uA | 60 uA | 60 uA | N/A |
| Exit Latency | N/A | <100 uS | <2 mS | <20 mS |

Although described herein with respect to a UFS system comprising a mobile industry processor interface (MIPI) Unified Protocol (UniPro) and M-PHY physical layer and a NAND (e.g., 3D NAND) memory device, such Deep Idle power mode is applicable to other types of physical layers or interfaces, as well as other storage systems or memories, such as 3D XPoint memory, Ferro-electric memory (Fe-RAM), etc. The values illustrated herein, including in Table 1, can include maximum values, e.g., set using one or more power parameter descriptors.

FIG. 1 illustrates an example system (e.g., a host system) 100 including a host device 105 (e.g., a UFS host) and a storage system 110 (e.g., a UFS device) configured to communicate over a communication interface (I/F) 115 (e.g., a bidirectional parallel or serial communication interface, such as a UFS interface). In an example, the communication interface 115 can be referred to as a host interface. The host device 105 can include a host processor 106 (e.g., a host central processing unit (CPU) or other processor or processing circuitry, such as a memory management unit (MMU), interface circuitry, etc.). In certain examples, the host device 105 can include a main memory (MAIN MEM) 108 (e.g., DRAM, etc.) and optionally, a static memory (STATIC MEM) 109, to support operation of the host processor (HOST PROC) 106.

The storage system 110 can include a universal flash storage (UFS) device, an embedded MMC (eMMC™) device, or one or more other memory devices. For example, the communication interface 115 of a UFS device can include a serial bidirectional interface, such as defined in one or more Joint Electron Device Engineering Council (JEDEC) standards (e.g., JEDEC standard D2230 (JESD223D), commonly referred to as JEDEC UFS Host Controller Interface (UFSHCI) 3.0, etc.), including, for example upstream and downstream lanes (e.g., DIN_t, DIN_c and DOUT_t, DOUT_c, respectively).

In another example, if the storage system 110 includes an eMMC device, the communication interface 115 can include a number of parallel bidirectional data lines (e.g., DAT[7:0]) and one or more command lines, such as defined in one or more JEDEC standards (e.g., JEDEC standard D84-B51 (JESD84-A51), commonly referred to as JEDEC eMMC standard 5.1, etc.). In other examples, the storage system 110 can include one or more other memory devices, or the communication interface 115 can include one or more other interfaces, depending on the host device 105 and the storage system 110.

The storage system 110 can include a memory controller (MEM CTRL) 111 and a non-volatile memory device 112. The memory controller 111 can optionally include a limited amount of static memory 119 to support operations of the memory controller 111. In an example, the non-volatile memory device 112 can include a number of non-volatile memory devices (e.g., dies or LUNs), such as one or more stacked flash memory devices (e.g., as illustrated with the stacked dashes underneath the non-volatile memory device 112), etc., each including non-volatile memory (NVM) 113 (e.g., one or more groups of non-volatile memory cells) and a device controller (CTRL) 114 or other periphery circuitry thereon (e.g., device logic, etc.), and controlled by the memory controller 111 over an internal storage-system communication interface (e.g., an Open NAND Flash Interface (ONFI) bus, etc.) separate from the communication interface 115. Control circuitry, as used herein, can refer to one or more of the memory controller 111, the device controller 114, or other periphery circuitry in the storage system 110, the NVM device 112, etc.

Flash memory devices typically include one or more groups of one-transistor, floating gate (FG) or replacement gate (RG) (or charge trapping) storage structures (memory cells). Two common types of flash memory array architectures include NAND and NOR architectures. The memory cells of the memory array are typically arranged in a matrix. The gates of each memory cell in a row of the array are coupled to an access line (e.g., a word line). In NOR architecture, the drains of each memory cell in a column of the array are coupled to a data line (e.g., a bit line). In NAND architecture, the drains of each memory cell in a column of the array are coupled together in series, source to drain, between a source line and a bit line.

Each memory cell in a NOR, NAND, 3D XPoint, FeRAM, MRAM, or one or more other architecture semiconductor memory array can be programmed individually or collectively to one or a number of programmed states. A single-level cell (SLC) can represent one bit of data per cell in one of two programmed states (e.g., 1 or 0). A multi-level cell (MLC) can represent two or more bits of data per cell in a number of programmed states (e.g., $2^n$, where n is the number of bits of data). In certain examples, MLC can refer to a memory cell that can store two bits of data in one of 4 programmed states. A triple-level cell (TLC) can represent three bits of data per cell in one of 8 programmed states. A quad-level cell (QLC) can represent four bits of data per cell in one of 16 programmed states. In other examples, MLC can refer to any memory cell that can store more than one bit of data per cell, including TLC and QLC, etc.

In three-dimensional (3D) architecture semiconductor memory device technology, memory cells can be stacked, increasing the number of tiers, physical pages, and accordingly, the density of memory cells in a memory device. Data is often stored arbitrarily on the storage system as small units. Even if accessed as a single unit, data can be received in small, random 4-16 k single file reads (e.g., 60%-80% of operations are smaller than 16 k). It is difficult for a user and even kernel applications to indicate that data should be stored as one sequential cohesive unit. File systems are typically designed to optimize space usage, and not sequential retrieval space.

The memory controller 111 can receive instructions from the host device 105, and can communicate with the non-volatile memory device 112, such as to transfer data to (e.g., write or erase) or from (e.g., read) one or more of the memory cells of the non-volatile memory device 112. The memory controller 111 can include, among other things, circuitry or firmware, such as a number of components or integrated circuits. For example, the memory controller 111 can include one or more memory control units, circuits, or components configured to control access across the memory array and to provide a translation layer between the host device 105 and the storage system 100, such as a memory manager, one or more memory management tables, etc.

The memory manager can include, among other things, circuitry or firmware, such as a number of components or integrated circuits associated with various memory management functions, including, among other functions, wear leveling (e.g., garbage collection or reclamation), error detection or correction, block retirement, or one or more other memory management functions. The memory manager 125 can parse or format host commands (e.g., commands received from the host device 105) into device commands (e.g., commands associated with operation of a memory array, etc.), or generate device commands (e.g., to accomplish various memory management functions) for the device controller 114 or one or more other components of the storage system 110.

The memory manager can include a set of management tables configured to maintain various information associated with one or more component of the storage system 110 (e.g., various information associated with a memory array or one or more memory cells coupled to the memory controller 111). For example, the management tables can include information regarding block age, block erase count, error history, or one or more error counts (e.g., a write operation error count, a read bit error count, a read operation error count, an erase error count, etc.) for one or more blocks of memory cells coupled to the memory controller 111. In certain examples, if the number of detected errors for one or more of the error counts is above a threshold, the bit error can be referred to as an uncorrectable bit error. The management tables can maintain a count of correctable or uncorrectable bit errors, among other things. In an example, the management tables can include translation tables or a L2P mapping.

The memory manager can implement and use data structures to reduce storage system 110 latency in operations that involve searching L2P tables for valid pages, such as garbage collection. To this end, the memory manager is arranged to maintain a data structure (e.g., table region data structure, tracking data structure, etc.) for a physical block. The data structure includes indications of L2P mapping table regions, of the L2P table. In certain examples, the data structure is a bitmap (e.g., a binary array). In an example, the bitmap includes a bit for each region of multiple, mutually exclusive, regions that span the L2P table.

The non-volatile memory device 112 or the non-volatile memory 113 (e.g., one or more 3D NAND architecture semiconductor memory arrays) can include a number of memory cells arranged in, for example, a number of devices, planes, blocks, physical pages, super blocks, or super pages. As one example, a TLC memory device can include 18,592 bytes (B) of data per page, 1536 pages per block, 548 blocks per plane, and 4 planes per device. As another example, an MLC memory device can include 18,592 bytes (B) of data per page, 1024 pages per block, 548 blocks per plane, and 4 planes per device, but with half the required write time and twice the program/erase (P/E) cycles as a corresponding TLC memory device. Other examples can include other numbers or arrangements. A super block can include a combination of multiple blocks, such as from different planes, etc., and a window can refer to a stripe of a super block, typically matching a portion covered by a physical-to-logical (P2L) table chunk, etc., and a super page can include a combination of multiple pages.

The term "super" can refer to a combination or multiples of a thing or things. For examples, a super block can include a combination of blocks. If a memory device includes 4 planes, a super block may refer to the same block on each plane, or a pattern of blocks across the panes (e.g., a combination of block 0 on plane 0, block 1 on plane 1, block 2 on plane 2, and block 3 on plane 3, etc.). In an example, if a storage system includes multiple memory devices, the combination or pattern of blocks can extend across the multiple memory devices. The term "stripe" can refer to a pattern of combination or pattern of a piece or pieces of a thing or things. For example, a stripe of a super block can refer to a combination or pattern of pages from each block in the super block.

In operation, data is typically written to or read from the storage system 110 in pages and erased in blocks. However, one or more memory operations (e.g., read, write, erase, etc.) can be performed on larger or smaller groups of memory cells, as desired. For example, a partial update of tagged data from an offload unit can be collected during data migration or garbage collection to ensure it was re-written efficiently. The data transfer size of a memory device is typically referred to as a page, whereas the data transfer size of a host device is typically referred to as a sector. Although a page of data can include a number of bytes of user data (e.g., a data payload including a number of sectors of data) and its corresponding metadata, the size of the page often refers only to the number of bytes used to store the user data. As an example, a page of data having a page size of 4 kB may include 4 kB of user data (e.g., 8 sectors assuming a sector size of 512B) as well as a number of bytes (e.g., 32B, 54B, 224B, etc.) of auxiliary or metadata corresponding to the user data, such as integrity data (e.g., error detecting or correcting code data), address data (e.g., logical address data, etc.), or other metadata associated with the user data.

Different types of memory cells or memory arrays can provide for different page sizes, or may require different amounts of metadata associated therewith. For example, different memory device types may have different bit error rates, which can lead to different amounts of metadata necessary to ensure integrity of the page of data (e.g., a memory device with a higher bit error rate may require more bytes of error correction code (ECC) data than a memory device with a lower bit error rate). As an example, an MLC NAND flash device may have a higher bit error rate than a corresponding SLC NAND flash device. As such, the MLC device may require more metadata bytes for error data than the corresponding SLC device.

In an example, the data in a chunk or data unit can be handled in an optimized manner throughout its tenure on the storage system. For example, the data is managed as one unit during data migration (e.g., garbage collection, etc.) such that the efficient read/write properties are preserved as data is moved to its new physical location on the storage system. In certain examples, the only limit to the number of chunks, data units, or blocks configurable for storage, tagging, etc., are the capacities of the system.

One or more of the host device 105 or the storage system 110 can include interface circuitry, such as host interface circuitry (I/F CKT) 107 or storage interface circuitry (I/F CKT) 117, configured to enable communication between components of the host system 100. Each interface circuitry can include one or more UFS Interconnect (UIC) layers, such as mobile industry processor interface (MIPI) Unified Protocol (UniPro) and M-PHY layers (e.g., physical layers), including circuit components and interfaces. The M-PHY layer includes the differential transmit (TX) and receive (RX) signaling pairs (e.g., DIN_t, DIN_c and DOU_t, DOUT_c, etc.). In certain examples, the host I/F CKT 107 can include a controller (e.g., a UFS controller), a driver circuit (e.g., a UFS driver), etc. Although described herein with respect to the UniPro and M-PHY layers, one or more other set of circuit components or interfaces can be used to transfer data between circuit components of the host system 100.

Components of the host system 100 can be configured to receive or operate using one or more host voltages, including, for example, VCC, VCCQ, and, optionally, VCCQ2. In certain examples, one or more of the host voltages, or power rails, can be managed or controlled by a power management integrated circuit (PMIC) 121. In certain examples, VCC can be a first supply voltage (e.g., 2.7V-3.3V, 1.7V-1.95V, etc.). In an example, one or more of the static memory 119 or the non-volatile memory devices 112 can require VCC for operation. VCCQ can be a second supply voltage, lower than the VCC (e.g., 1.1V-1.3V, etc.). In an example, one or more of the memory controller 111, the communication interface 115, or memory I/O or other low voltage blocks can optionally require VCCQ for operation. VCCQ2 can be a third supply voltage between VCC and VCCQ (e.g., 1.7V-1.95V, etc.). In an example, one or more of the memory controller 111 of the communication interface, or other low voltage block can optionally require VCCQ2. Each host voltage can be set to provide voltage at one or more current levels, in certain examples, controllable by one or more device descriptors and levels (e.g., between [0:15], each representing a different maximum expected source current, etc.).

The present inventors have further recognized, among other things, an additional power state signal interface (PWR_ST) 120 can be added to the host system 100, such as to enable the storage system 110 to communicate a power status to the host device 105 while the host interface 115 is disabled or powered down, such as to enable reduction or removal of VCC or one or more other power rails from the host system 100 without requiring an active communication interface 115. Accordingly, using the power state signal interface 120, the storage system 110 can provide an indication to the host device 105, which traditionally controls host system 100 power levels, such as using the PMIC 121, etc., that the storage system 110 is entering a low-power, power saving power mode. The storage system 110 may provide such indication after moving data stored in volatile memory (e.g., cache, static memory 119, etc.) to non-volatile memory 113, etc. In response, the host device 105 may remove VCC or one or more other power rails, etc., from the storage system 110 or from the host system 100 generally. For example, the power state signal interface 120 may be pulled high when the storage system 110 is active, and low when the storage system 110 is ready for VCC to be removed. The PMIC 121 can receive an indication, such as from the power state signal interface 120, and cut off VCC when receiving such indication from the storage system 110, such as after sending a power saving power mode request to the storage system 110, etc. The power state signal interface 120 can be in addition to or separate from the communication interface 115 (or a hardware reset interface), and in certain examples, can be unidirectional from the storage system 110 to the host device 105.

Figure 2:
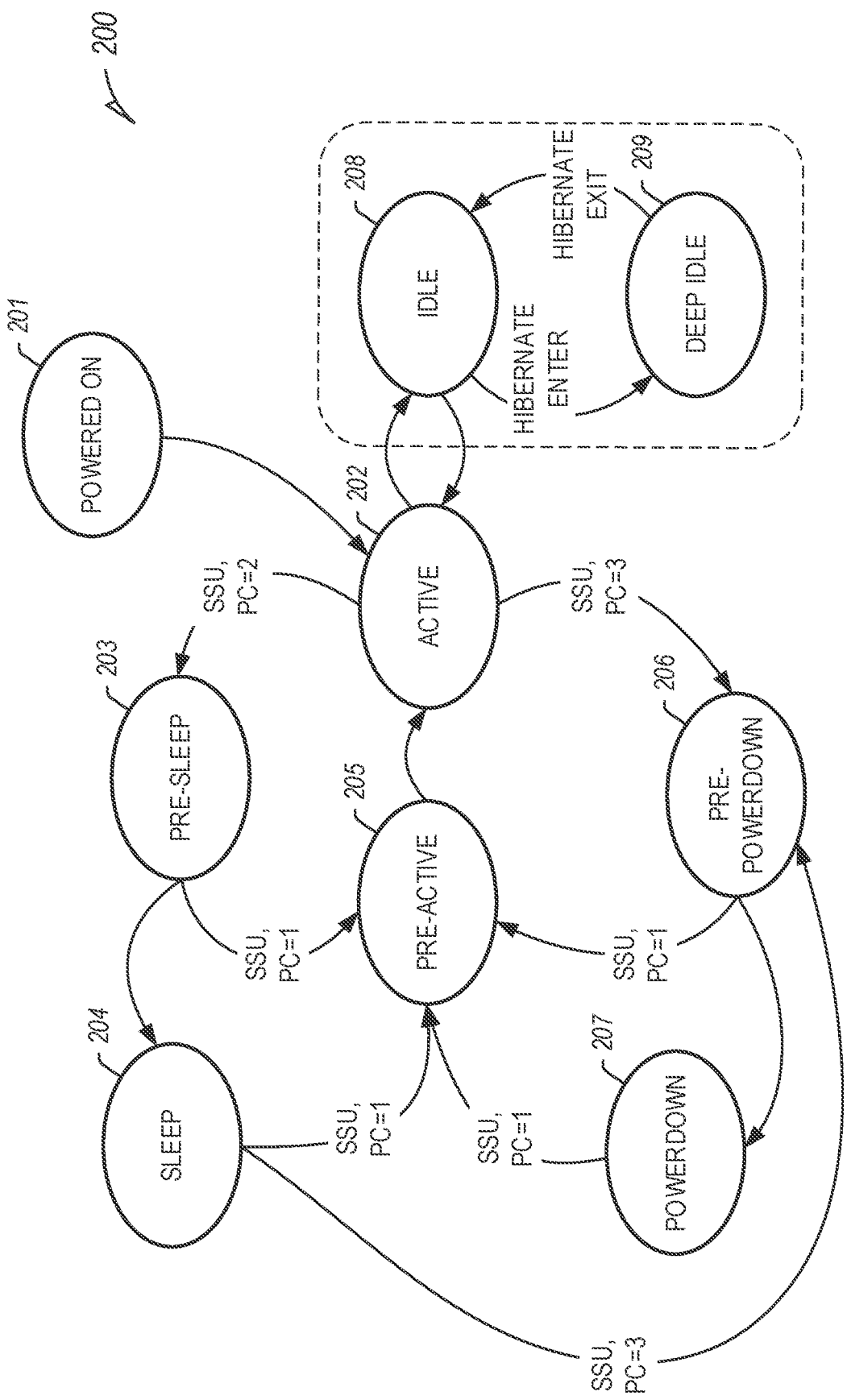
FIG. 2 illustrates an example state diagram of different power modes.

FIG. 2 illustrates an example state diagram 200 of different power modes (e.g., UFS power modes). The state diagram 200 includes four major power modes: an Active power mode 202, a Sleep power mode 204, a PowerDown power mode 207, and an idle power mode 208. The state diagram 200 further includes three transitional modes to facilitate transition between or into each of the major power modes, including: a Pre-Sleep power mode 203, a Pre-Active power mode 205, and a Pre-PowerDown power mode 206.

The Powered-On power mode 201 can occur after a device (e.g., a UFS device, such as a UFS host, a UFS storage system, etc.) is powered on or reset (e.g., a hardware reset, etc.). After initialization, the device can transition to the Active power mode 202 to respond to or perform commands or background operations. From the Active power mode 202, the device can transition to one of several other power modes, including the Sleep power mode 204, the PowerDown power mode 207, or the Idle power mode 208, depending on, among other things, the receipt (or lack thereof) of a Start Stop Unit (SSU) command or expiration of a timer without a received SSU. SSU commands include, among other things, a power condition (PC) field. A PC field set to 1 (1 h) can transition the device to the Active power mode. A PC field set to 2 (2 h) can transition the device to the Sleep power mode. A PC field set to 3 (3 h) can transition the device to a PowerDown power mode. In other examples, one or more other PC fields or SSU fields can be defined or used.

The Active power mode 202 can be entered from the Powered-On power mode 201 or the Pre-Active power mode 205 after completion of setup necessary to handle such commands or operations. The Idle power mode 208 can be entered after execution of a pending command or background operation. The receipt of any command can transition the device from the Idle power mode 208 to the Active power mode 202. In addition, the Active Power mode 202 can be re-entered before transitioning to the Sleep power mode 204 or the PowerDown power mode 207, such as after a period of time without receiving a command or performing a background activity or in response to a command.

The Sleep power mode 204 may reduce power consumption of the device, such as compared to the Active power mode 202 or the Idle power mode 208. In certain examples, VCC is removed during the Sleep power mode 204, and the device may only respond to a reduced subset of commands. In certain examples, VCC should be restored prior to issuing an SSU to request transition to the Active power mode 202 or the PowerDown power mode 207. The PowerDown power mode 207 may further reduce power consumption of the device beyond that reduced in the Sleep power mode 204. In the PowerDown power mode 207, all VCC and power supplies may be removed, and all volatile data requiring such power may be lost.

The transitional power modes, including the Pre-Sleep power mode 203, the Pre-Active power mode 205, and the Pre-PowerDown power mode 206, may be entered prior to entering their respective subsequent power modes until any outstanding commands, operations, or management activities have been completed, or until all preparation needed to perform the subsequent power mode has been completed. In certain examples, the transitional power modes may consume no more power than is consumed in their subsequent power modes, i.e., the Pre-Active power mode 205 may consume no more power than the Active power mode 202, etc.

The present inventors have recognized, among other things, changes to the traditional Idle power mode 208, or an additional Deep Idle power mode 209, configured to further reduce power consumption of the device (such as in contrast to the Idle power mode 208) while maintaining responsiveness to incoming commands (such as in contrast to the Sleep power mode 204). In an example, a threshold time (e.g., configurable by a host device) after entry of the Idle power mode 208, with the communication interface (e.g., a UniPro layer) in a hibernate state, the device may enter a Deep Idle power mode 209. Previously, the hibernate state and power state changes were controlled by the host device, such as through one or more SSU. The subject matter described herein enables the device (e.g., a storage system or component thereof, etc.) to control or initiate a power saving mode (e.g., the Deep Idle power mode). In the Deep Idle power mode 209, the device can automatically save host data stored in volatile memory (e.g., cache, static memory, etc.) to non-volatile memory, replacing a host-controlled synch of volatile memory before entering a host-controlled power saving power mode.

With the communication interface (e.g., the UniPro layer, etc.) in a hibernate state, the host device cannot know whether VCC can be removed from the device (e.g., the storage system or component thereof, etc.) without loss of data without some other indication that the device is ready for VCC to be removed (e.g., volatile memory synched to non-volatile memory, etc.). In an example, the device can provide an indication to the host device that the device is in a power saving mode or is otherwise ready for VCC to be removed (e.g., after moving data from volatile memory to non-volatile memory, etc.), such as using a hardware pin (e.g., the power state signal interface 120). The device can automatically wake from or transition out of the Deep Idle power mode 209 upon receipt of a UFS command or exit of the hibernate state, such as from the host device.

Figure 3A:
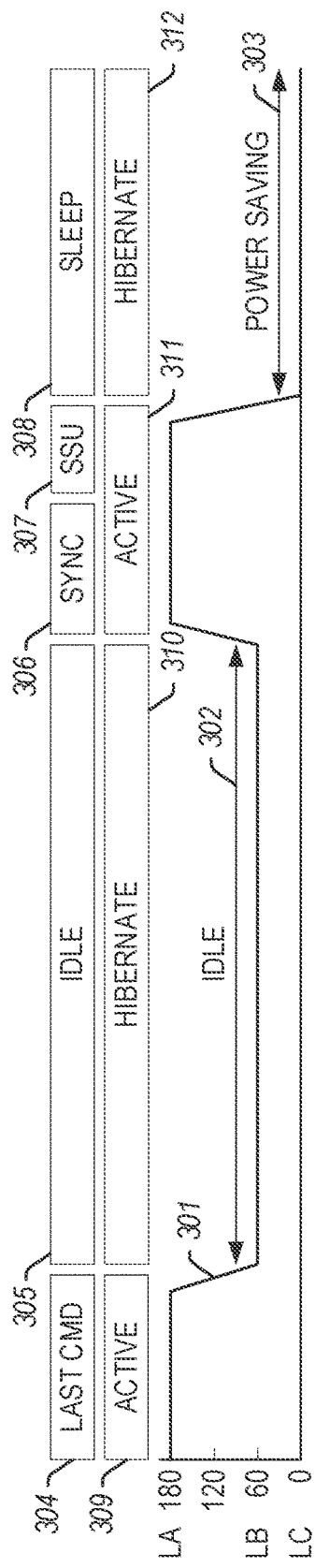
FIGS. 3A-3C illustrate example current draws for different power modes, including Active, Idle, and Deep Idle power modes.
Figure 3B:
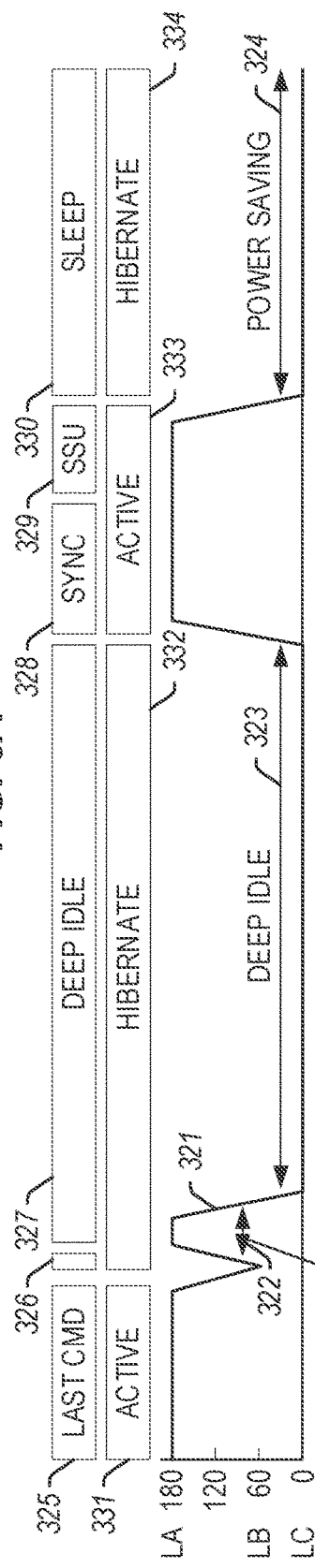
Figure 3C:
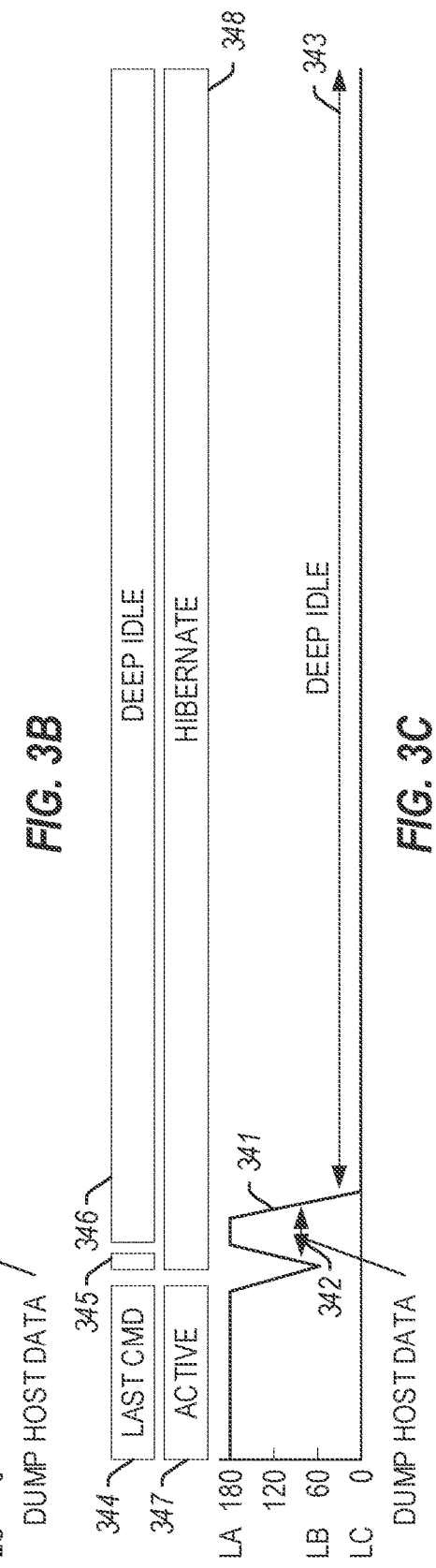

FIGS. 3A-3C illustrate example device operation and associated current in different power modes. Although described herein with respect to a UniPro layer, in other examples, one or more other physical layers, such as one or more other physical interfaces or interface circuitry, can be used in accordance with the teachings described herein.

FIG. 3A illustrates example device operation and current 301 in time from an Active power mode to an Idle power mode 302, then to a power saving power mode 303. At 304, a command is performed in the Active power mode. During performance of the command, the UniPro layer is in an Active state at 309. Current draw in the Active power mode can be roughly 180 mA or more (LA). At 305, an Idle power mode 302 begins after completion of the last command, and the UniPro layer is in a hibernate state at 310, reducing current draw to roughly 30-60 mA (LB), etc. Receipt of a command in the Idle power mode 302 may transition the device back to the Active power mode.

After a first threshold amount of time (e.g., 5 seconds, etc.) in the Idle power mode 302, the device can transition to the power saving power mode 303, such as a Sleep power mode at 308, etc., with the UniPro layer in a hibernate state at 312 and a current draw less than 1 mA (LC). To reach the power saving power mode 303, however, the device transitions through the Active power mode (as illustrated in FIG. 2) with the UniPro layer in an active state at 311, such as to enable the device to synch volatile memory (e.g., static memory, cache, etc., of a host device or a storage system) to non-volatile memory at 306. After synching volatile memory, and in response to an SSU with PC=2 (2 h) at 307, the device can enter the power saving power mode 303 (e.g., the Sleep power mode at 308, such as through a Pre-Sleep power mode), where VCC may be optionally removed, etc. To return to the Active power mode from the Sleep or other power saving power mode, such as in response to an SSU with PC=1 (1 h), the UniPro layer can be placed in an active state and VCC can be restored.

FIG. 3B illustrates example device operation and current 321 in time from an Active power mode to a Deep Idle power mode at 323, then to a power saving power mode at 324. At 325, a command is performed in the Active power mode. During performance of the command, the UniPro layer is in an Active state at 331. Current draw in the Active power mode can be roughly 180 mA or more (LA). At 326, an Idle power mode can begin and the UniPro layer can be in a hibernate state at 332, reducing current draw. After a second threshold amount of time in the Idle power mode (e.g., 10 mS, 20 mS, 50 mS, etc.), such as without receiving a command, a Deep Idle power mode can begin at 327, reducing current draw to less than 1 mA (LC), a substantial savings (e.g., from 60 mA to 320 uA, such as illustrated in Table 1 above, etc.). In an example, in addition to the threshold amount of time in the Idle power mode at 326, the UniPro layer may also be required to be in the hibernate state at 332 for the device to enter the Deep Idle power mode at 327. Receipt of a command in the Deep Idle power mode 323 may transition the device back to the Active power mode.

At the beginning of, or prior to the Deep Idle power mode at 327, with the UniPro layer in a hibernate state at 332, the device (e.g., the storage system or one or more component thereof, etc.) can dump host data at 322 to non-volatile memory (e.g., the storage system can transfer host data from volatile memory of the storage system, such as cache, static memory, etc., to non-volatile memory of the storage system, etc.). Dumping host data at 322, such as to non-volatile memory, enables the device to further reduce power consumption, as power no longer needs to be retained to store data in volatile memory, further reducing power consumption in the Deep Idle power mode, such as in contrast to that disclosed in FIG. 3A (e.g., from 33 mA to 320 uA, etc.). The Deep Idle power mode, however, requires more time to respond to a received command than the idle power mode of FIG. 3A (e.g., from 100 uS to 2 mS, etc.). Such changes in current and exit latency are further illustrated in Table 1 above.

After a threshold amount of time (e.g., the first threshold amount of time, such as 5 seconds, etc.) in the Deep Idle power mode 323, the device can transition to the power saving power mode 324, such as a Sleep power mode at 330, etc., with the UniPro layer in a hibernate state at 334 and a current draw less than 1 mA (LC). To reach the power saving power mode 303, however, the device transitions through the Active power mode (as illustrated in FIG. 2) with the UniPro layer in an active state at 333, such as to enable the device to synch volatile memory (e.g., static memory, cache, etc., of the host device or the storage system) to non-volatile memory at 328. After synching volatile memory, and in response to an SSU with PC=2 (2 h) at 329, the device can enter the power saving power mode 324 (e.g, the Sleep power mode at 330, such as through a Pre-Sleep power mode), where VCC may be optionally removed, etc. To return to the Active power mode from the Sleep or other power saving power mode, such as in response to an SSU with PC=1 (1 h), the UniPro layer can be placed in an active state and VCC can be restored.

FIG. 3C illustrates example device operation and current 341 in time from an Active power mode to a Deep Idle power mode at 343. At 344, a command is performed in the Active power mode. During performance of the command, the UniPro layer is in an Active state at 347. Current draw in the Active power mode can be roughly 180 mA or more (LA). At 345, an Idle power mode can begin and the UniPro layer can be in a hibernate state at 348, reducing current draw. After a second threshold amount of time in the Idle power mode (e.g., 10 mS, 20 mS, 50 mS, etc.), such as without receiving a command, a Deep Idle power mode can begin at 346, reducing current draw to less than 1 mA (LC). In an example, in addition to the threshold amount of time in the Idle power mode at 345, the UniPro layer may also be required to be in the hibernate state at 348 for the device to enter the Deep Idle power mode at 346. Receipt of a command in the Deep idle power mode 346 may transition the device back to the Active power mode.

At the beginning of, or prior to the Deep Idle power mode at 346, with the UniPro layer in a hibernate state at 348, the device (e.g., the storage system or one or more component thereof, etc.) can dump host data at 342 to non-volatile memory (e.g., the storage system can transfer host data from volatile memory of the storage system, such as cache, static memory, etc., to non-volatile memory of the storage system, etc.). In contrast to that illustrated in FIG. 36, however, the device can stay in the Deep idle power mode at 343, typically with VCC on, and not transition to the power saving power mode (e.g., through the Active power mode, etc.), reducing exit latency in response to a received command, such as from 20 mS to 2 mS, at a relatively small current cost (e.g., 60 uA, such as illustrated in Table 1 above).

Both FIGS. 3B and 3C require no additional host driver changes for implementation, and may work with existing circuitry and protocols, such as those illustrated in FIG. 3A.

An example device descriptor for such Deep Idle power mode described herein can include the following Offset, Size, Name, Manufacturer Default Value (MDV), User Configuration (User Conf), and Description:

TABLE 2

Example Device Descriptor

| Offset | Size | Name | MDV | User Conf | Description |
|---|---|---|---|---|---|
| 4Fh | 4 | dExtendedUFS-FeaturesSupport | Device Specific | No | Bit[0]: FFU<br>Bit[1]: PSA<br>. . .<br>Bit[8]: Turbo Write<br>Bit[9]: Deep Idle<br>Bit[10:31]: Reserved |

An example Configuration Descriptor Header and Device Descriptor configurable parameters can include:

TABLE 3

Example Configuration Descriptor Header and Device Descriptor Configurable Parameters

| Offset | Size | Name | MDV | Description |
|---|---|---|---|---|
| 12h | 1 | bDeepIdleTimer | Device Specific | 00h: Disable Deep Idle Mode x mS after M-PHY stays in a hibernate state (unit: 1 mS) |

Figure 4:
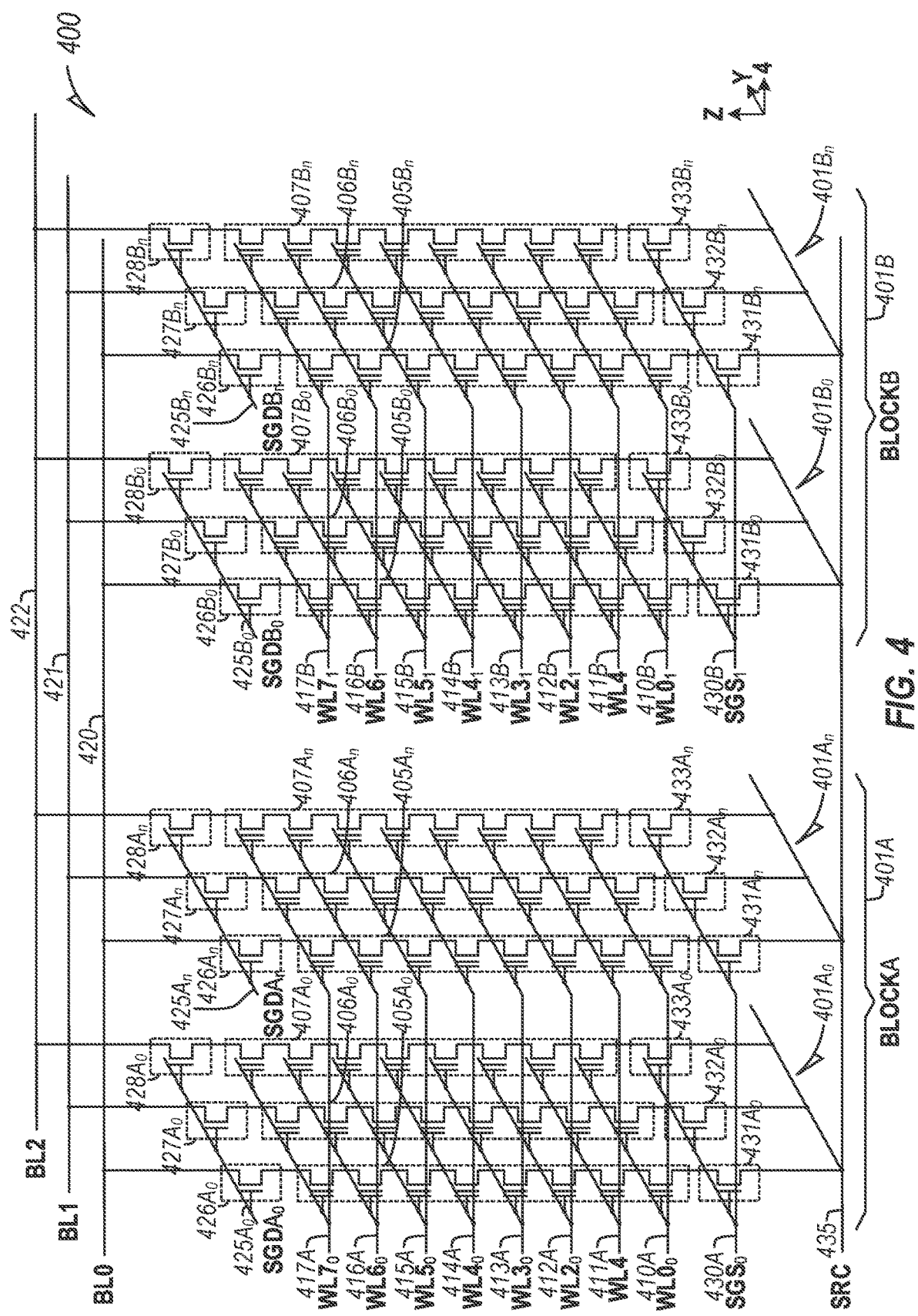
FIG. 4 illustrates an example schematic diagram of a NAND architecture semiconductor memory array.

FIG. 4 illustrates an example schematic diagram of a 3D NAND architecture semiconductor memory array 400 including a number of strings of memory cells (e.g., first-third $A_0$ memory strings $405A_0$-$407A_0$, first-third $A_n$ memory strings $405A_n$-$407A_n$, first-third $B_0$ memory strings $405B_0$-$407B_0$, first-third $B_n$ memory strings $405B_n$-$407B_n$, etc.), organized in blocks (e.g., block A 401A, block B 401B, etc.) and sub-blocks (e.g., sub-block $A_0$ $401A_0$, sub-block $A_n$ $401A_n$, sub-block $B_0$ $401B_0$, sub-block $B_n$ $401B_n$, etc.). The memory array 400 represents a portion of a greater number of similar structures that would typically be found in a block, device, or other unit of a memory device.

Each string of memory cells includes a number of tiers of storage structures stacked in the Z direction, source to drain, between a source line (SRC) 435 or a source-side select gate (SGS) (e.g., first-third $A_0$ SGS $431A_0$-$433A_0$, first-third $A_n$ SGS $431A_n$-$433A_n$, first third $B_0$ SGS $431B_0$-$433B_0$, first third $B_n$ SGS $431B_n$-$433B_n$, etc.) and a drain-side select gate (SGD) (e.g., first third $A_0$ SGD $426A_0$-$428A_0$, first-third $A_n$ SGD $426A_n$-$428A_n$, first-third $B_0$ SGD $426B_0$-$428B_0$, first third $B_n$ SGD $426B_n$-$428B_n$, etc.). Each string of memory cells in the 3D memory array can be arranged along the X direction as data lines (e.g., bit lines (BL) BL0-BL3 420-422), and along the Y direction as physical pages.

Within a physical page, each tier represents a row of memory cells, and each string of memory cells represents a column. A sub-block can include one or more physical pages. A block can include a number of sub-blocks (or physical pages) (e.g., 128, 256, 384, etc.). Although illustrated herein as having two blocks, each block having two sub-blocks, each sub-block having a single physical page, each physical page having three strings of memory cells, and each string having 8 tiers of memory cells, in other examples, the memory array 400 can include more or fewer blocks, sub-blocks, physical pages, strings of memory cells, memory cells, or tiers. For example, each string of memory cells can include more or fewer tiers (e.g., 16, 32, 64, 128, etc.), as well as one or more additional tiers of semiconductor material above or below the storage transistors (e.g., select gates, data lines, etc.), as desired. As an example, a 48 GB TLC NAND memory device can include 18,592 bytes (B) of data per page (16,384+2208 bytes), 1536 pages per block, 548 blocks per plane, and 4 or more planes per device.

Each memory cell in the memory array 400 includes a control gate (CG) coupled to (e.g., electrically or otherwise operatively connected to) an access line (e.g., word lines (WL) $WL0_0$-$WL7_0$ 410A-417A, $WL0_1$-$WL7_1$ 410B-417B, etc.), which collectively couples the control gates (CGs) across a specific tier, or a portion of a tier, as desired. Specific tiers in the 3D memory array, and accordingly, specific memory cells in a string, can be accessed or controlled using respective access lines. Groups of select gates can be accessed using various select lines. For example, first third $A_0$ SGD $426A_0$-$428A_0$ can be accessed using an $A_0$ SGD line $SGDA_0$-$425A_0$, first-third $A_n$ SGD $426A_n$-$428A_n$ can be accessed using an $A_n$ SGD line $SGDA_n$-$425A_n$, first-third $B_0$ SGD $426B_0$-$428B_0$ can be accessed using a $B_0$ SGD line $SGDA_0$-$425B_0$, and first third $B_n$ SGD $426B_n$-$428B_n$ can be accessed using a $B_n$ SGD line $SGDB_n$ $425B_n$. First-third $A_0$ SGS $431A_0$-$433A_0$ and first third $A_n$ SGS $431A_n$-$433A_n$ can be accessed using a gate select line $SGS_0$ 430A, and first-third $B_0$ SGS $431B_0$-$433B_0$ and first third $B_n$ SGS $431B_n$-$433B_n$ can be accessed using a gate select line $SGS_1$ 430B.

In an example, the memory array 400 can include a number of levels of semiconductor material (e.g., polysilicon, etc.) configured to couple the control gates (CGs) of each memory cell or select gate (or a portion of the CGs or select gates) of a respective tier of the array. Specific strings of memory cells in the array can be accessed, selected, or controlled using a combination of bit lines (BLs) and select gates, etc., and specific memory cells at one or more tiers in the specific strings can be accessed, selected, or controlled using one or more access lines (e.g., word lines).

In a NAND architecture semiconductor memory array, the state of a selected memory cell can be accessed by sensing a current or voltage variation associated with a particular data line containing the selected memory cell. The memory array 400 can be accessed (e.g., by a control circuit, one or more processors, digital logic, etc.) using one or more drivers. In an example, one or more drivers can activate a specific memory cell, or set of memory cells, by driving a particular potential to one or more data lines (e.g., bit lines BL0-BL2), access lines (e.g., word lines WL0-WL7), or select gates, depending on the type of operation desired to be performed on the specific memory cell or set of memory cells.

To program or write data to a memory cell, a programming voltage (Vpgm) (e.g., one or more programming pulses, etc.) can be applied to selected word lines (e.g., $WL4_0$), and thus, to a control gate of each memory cell coupled to the selected word lines. Programming pulses can begin, for example, at or near 15V, and, in certain examples, can increase in magnitude during each programming pulse application. While the program voltage is applied to the selected word lines, a potential, such as a ground potential (e.g., Vss), can be applied to the data lines (e.g., bit lines) and substrates (and thus the channels, between the sources and drains) of the memory cells targeted for programming, resulting in a charge transfer (e.g., direct injection or Fowler-Nordheim (FN) tunneling, etc.) from the channels to the floating gates of the targeted memory cells.

In contrast, a pass voltage (Vpass) can be applied to one or more word lines having memory cells that are not targeted for programming, or an inhibit voltage (e.g., Vcc) can be applied to data lines (e.g., bit lines) having memory cells that are not targeted for programming, for example, to inhibit charge from being transferred from the channels to the floating gates of such non-targeted memory cells. The pass voltage can be variable, depending, for example, on the proximity of the applied pass voltages to a word line targeted for programming. The inhibit voltage can include a supply voltage (Vcc), such as a voltage from an external source or supply (e.g., a battery, an AC-to-DC converter, etc.), relative to a ground potential (e.g., Vss).

As an example, if a programming voltage (e.g., 15V or more) is applied to a specific word line, such as $WL4_0$, a pass voltage of 10V can be applied to one or more other word lines, such as $WL3_0$, $WL5_0$, etc., to inhibit programming of non-targeted memory cells, or to retain the values stored on such memory cells not targeted for programming. As the distance between an applied program voltage and the non-targeted memory cells increases, the pass voltage required to refrain from programming the non-targeted memory cells can decrease. For example, where a programming voltage of 15V is applied to $WL4_0$, a pass voltage of 10V can be applied to $WL3_0$ and $WL5_0$, a pass voltage of 8V can be applied to $WL2_0$ and $WL6_0$, a pass voltage of 7V can be applied to $WL1_0$ and $WL7_0$, etc. In other examples, the pass voltages, or number of word lines, etc., can be higher or lower, or more or less.

Sense amplifiers can be coupled to one or more of the data lines (e.g., first, second, or third bit lines (BL0-BL2) 420-422), can detect the state of each memory cell in respective data lines by sensing a voltage or current on a particular data line.

Between applications of one or more programming pulses (e.g., Vpgm), a verify operation can be performed to determine if a selected memory cell has reached its intended programmed state. If the selected memory cell has reached its intended programmed state, it can be inhibited from further programming. If the selected memory cell has not reached its intended programmed state, additional programming pulses can be applied. If the selected memory cell has not reached its intended programmed state after a particular number of programming pukes (e.g., a maximum number), the selected memory cell, or a string, block, or page associated with such selected memory cell, can be marked as defective.

To erase a memory cell or a group of memory cells (e.g., erasure is typically performed in blocks or sub-blocks), an erasure voltage (Vers) (e.g., typically Vpgm) can be applied to the substrates (and thus the channels, between the sources and drains) of the memory cells targeted for erasure (e.g., using one or more bit lines, select gates, etc.), while the word lines of the targeted memory cells are kept at a potential, such as a ground potential (e.g., Vss), resulting in a charge transfer (e.g., direct injection or Fowler-Nordheim (FN) tunneling, etc.) from the floating gates of the targeted memory cells to the channels.

Figure 5:
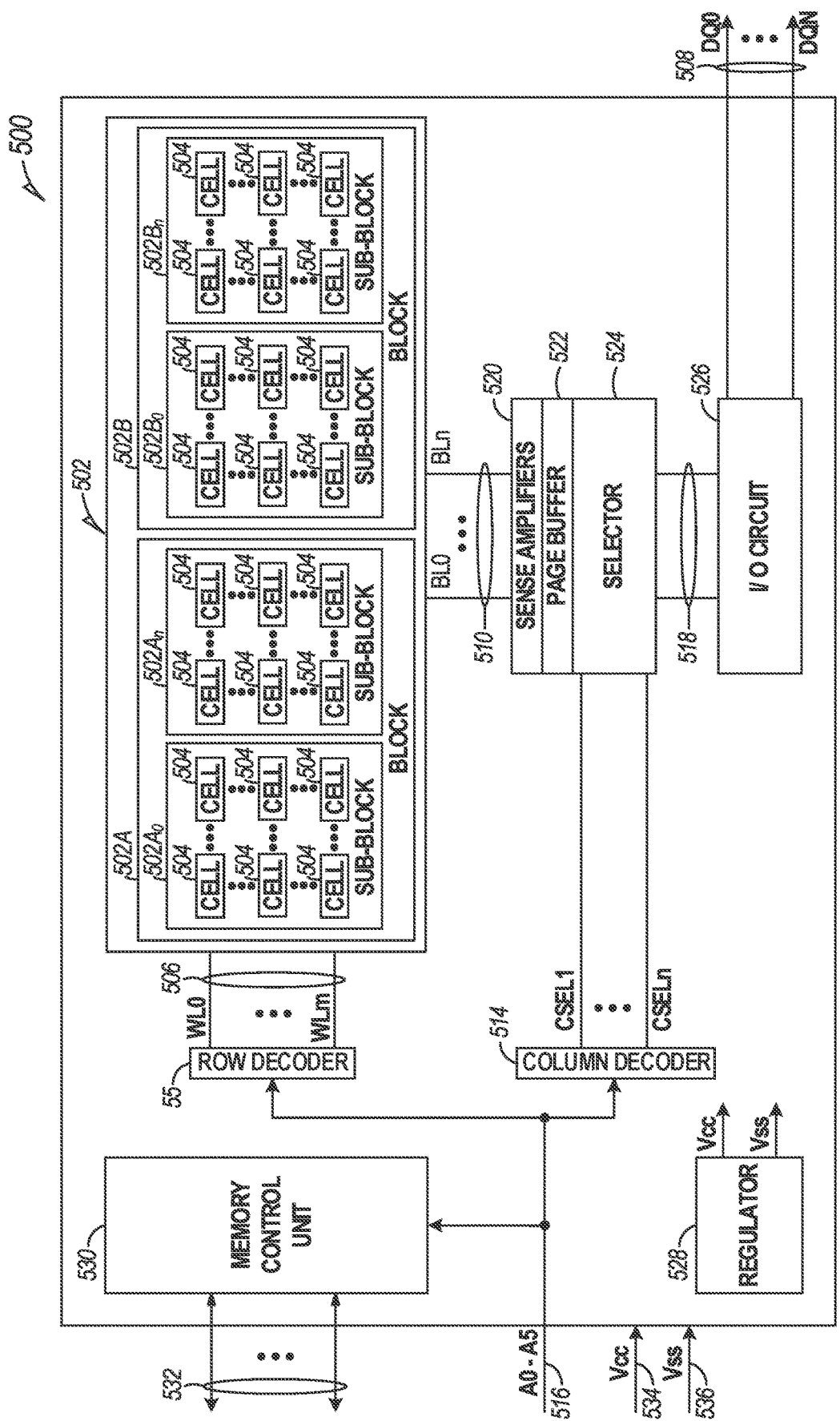
FIG. 5 illustrates an example block diagram of a memory module.

FIG. 5 illustrates an example block diagram of a memory device 500 including a memory array 502 having a plurality of memory cells 504, and one or more circuits or components to provide communication with, or perform one or more memory operations on, the memory array 502. Although shown with a single memory array 502, in other examples, one or more additional memory arrays, dies, or LUNs can be included herein. In certain examples, in a storage system having a number of dies or LUNs, the memory device 500 can represent a block diagram of circuits and components for each die or LUN. The memory device 500 can include a row decoder 512, a column decoder 514, sense amplifiers 520, a page buffer 522, a selector 524, an input/output (I/O) circuit 526, and a memory control unit 530.

The memory cells 504 of the memory array 502 can be arranged in blocks, such as first and second blocks 502A, 502б. Each block can include sub-blocks. For example, the first block 502A can include first and second sub-blocks $502A_0$, $502A_n$, and the second block 502б can include first and second sub-blocks $502B_0$, $502B_n$. Each sub-block can include a number of physical pages, each page including a number of memory cells 504. Although illustrated herein as having two blocks, each block having two sub-blocks, and each sub-block having a number of memory cells 504, in other examples, the memory array 502 can include more or fewer blocks, sub-blocks, memory cells, etc. In other examples, the memory cells 504 can be arranged in a number of rows, columns, pages, sub-blocks, blocks, etc., and accessed using, for example, access lines 506, first data lines 510, or one or more select gates, source lines, etc.

The memory control unit 530 can control memory operations of the memory device 500 according to one or more signals or instructions received on control lines 532, including, for example, one or more dock signals or control signals that indicate a desired operation (e.g., write, read, erase, etc.), or address signals (A0-AX) received on one or more address lines 516. One or more devices external to the memory device 500 can control the values of the control signals on the control lines 532, or the address signals on the address line 516. Examples of devices external to the memory device 500 can include, but are not limited to, a host, a memory controller, a processor, or one or more circuits or components not illustrated in FIG. 5.

The memory device 500 can use access lines 506 and first data lines 510 to transfer data to (e.g., write or erase) or from (e.g., read) one or more of the memory cells 504. The row decoder 512 and the column decoder 514 can receive and decode the address signals (A0-AX) from the address line 516, can determine which of the memory cells 504 are to be accessed, and can provide signals to one or more of the access lines 506 (e.g., one or more of a plurality of word lines (WL0-WLm)) or the first data lines 510 (e.g., one or more of a plurality of bit lines (BL0-BLn)), such as described above.

The memory device 500 can include sense circuitry, such as the sense amplifiers 520, configured to determine the values of data on (e.g., read), or to determine the values of data to be written to, the memory cells 504 using the first data lines 510. For example, in a selected string of memory cells 504, one or more of the sense amplifiers 520 can read a logic level in the selected memory cell 504 in response to a read current flowing in the memory array 502 through the selected string to the data lines 510.

One or more devices external to the memory device 500 can communicate with the memory device 500 using the I/O lines (DQ0-DQN) 508, address lines 516 (A0-AX), or control lines 532. The input/output (I/O) circuit 526 can transfer values of data in or out of the memory device 500, such as in or out of the page buffer 522 or the memory array 502, using the I/O lines 508, according to, for example, the control lines 532 and address lines 516. The page buffer 522 can store data received from the one or more devices external to the memory device 500 before the data is programmed into relevant portions of the memory array 502, or can store data read from the memory array 502 before the data is transmitted to the one or more devices external to the memory device 500.

The column decoder 514 can receive and decode address signals (A0-AX) into one or more column select signals (CSEL1-CSELn). The selector 524 (e.g., a select circuit) can receive the column select signals (CSEL1-CSELn) and select data in the page buffer 522 representing values of data to be read from or to be programmed into memory cells 504. Selected data can be transferred between the page buffer 522 and the I/O circuit 526 using second data lines 518.

The memory control unit 530 can receive positive and negative supply signals, such as a supply voltage (Vcc) 534 and a negative supply (Vss) 536 (e.g., a ground potential), from an external source or supply (e.g., an internal or external battery, an AC-to-DC converter, etc.). In certain examples, the memory control unit 530 can include a regulator 528 to internally provide positive or negative supply signals.

Figure 6:
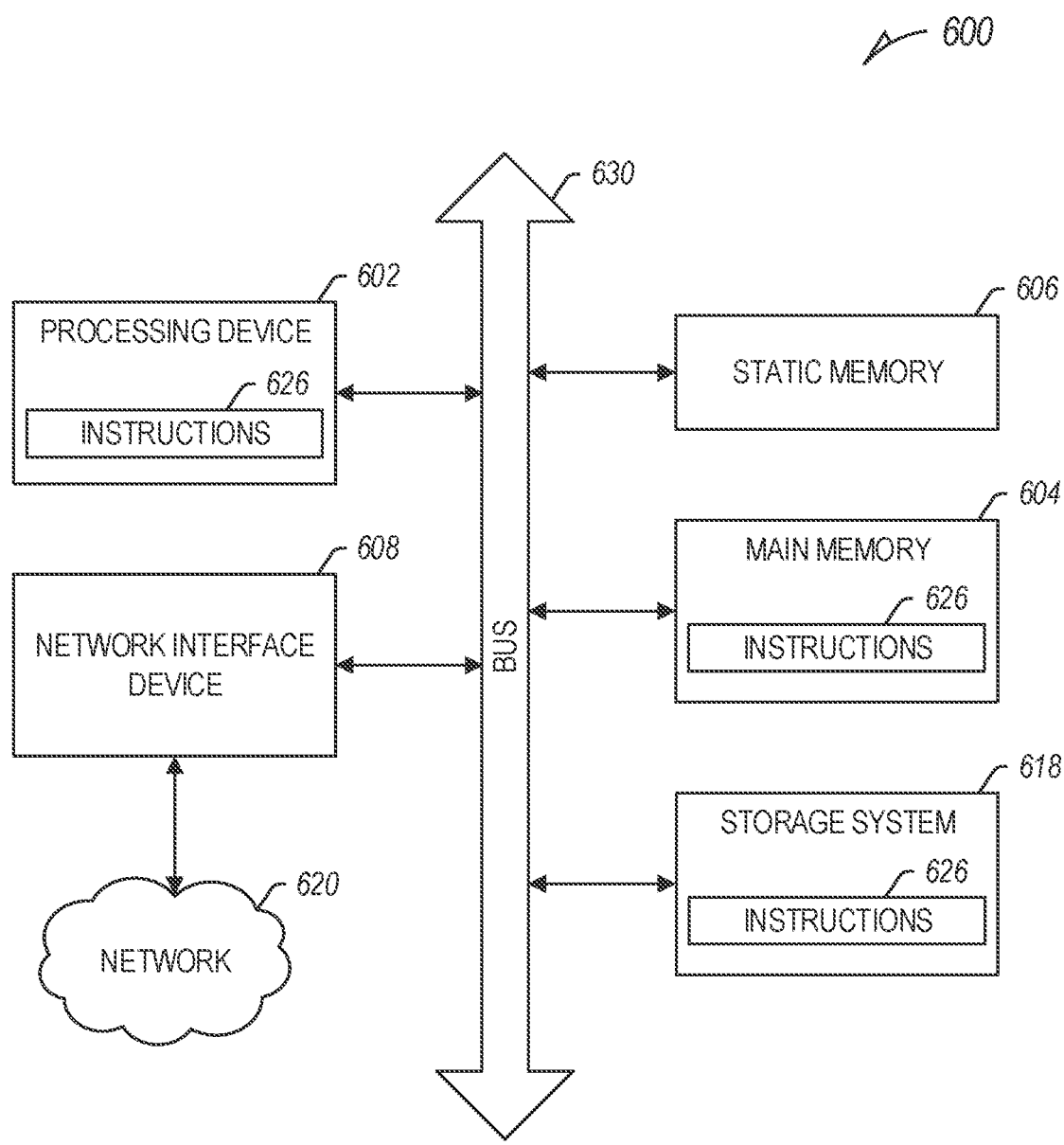
FIG. 6 illustrates an example block diagram of an information handling system.

FIG. 6 illustrates a block diagram of an example machine (e.g., a host system) 600 upon which any one or more of the techniques (e.g., methodologies) discussed herein may perform (e.g., such as those described in FIG. 1, etc.). In alternative embodiments, the machine 600 may operate as a standalone device or may be connected (e.g., networked) to other machines. In a networked deployment, the machine 600 may operate in the capacity of a server machine, a client machine, or both in server-client network environments. In an example, the machine 600 may act as a peer machine in peer-to-peer (P2P) (or other distributed) network environment. The machine 600 may be a personal computer (PC), a tablet PC, a set-top box (STB), a personal digital assistant (PDA), a mobile telephone, a web appliance, an IoT device, automotive system, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer duster configurations.

Examples, as described herein, may include, or may operate by, logic, components, devices, packages, or mechanisms. Circuitry is a collection (e.g., set) of circuits implemented in tangible entities that include hardware (e.g., simple circuits, gates, logic, etc.). Circuitry membership may be flexible over time and underlying hardware variability. Circuitries include members that may, alone or in combination, perform specific tasks when operating. In an example, hardware of the circuitry may be immutably designed to carry out a specific operation (e.g., hardwired). In an example, the hardware of the circuitry may include variably connected physical components (e.g., execution units, transistors, simple circuits, etc.) including a computer-readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable participating hardware (e.g., the execution units or a loading mechanism) to create members of the circuitry in hardware via the variable connections to carry out portions of the specific tasks when in operation. Accordingly, the computer-readable medium is communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry at a different time.

The machine (e.g., computer system, a host system, etc.) 680 may include a processing device 602 (e.g., a hardware processor, a central processing unit (CPU), a graphics processing unit (GPU), a hardware processor core, or any combination thereof, etc.), a main memory 604 (e.g., read-only memory (ROM), dynamic random-access memory (DRAM) such as synchronous DRAM (SDRAM) or Rambus DRAM (RDRAM), etc.), a static memory 606 (e.g., static random-access memory (SRAM), etc.), and a storage system 618, some or all of which may communicate with each other via a communication interface (e.g., a bus) 630.

The processing device 602 can represent one or more general purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. The processing device 602 can also be one or more special-purpose processing devices such as an application specific integrated circuit (ASIC), a field programmable gate array (FPGA), a digital signal processor (DSP), network processor, or the like. The processing device 602 can be configured to execute instructions 626 for performing the operations and steps discussed herein. The computer system 600 can further include a network interface device 608 to communicate over a network 620.

The storage system 618 can include a machine-readable storage medium (also known as a computer-readable medium) on which is stored one or more sets of instructions 626 or software embodying any one or more of the methodologies or functions described herein. The instructions 626 can also reside, completely or at least partially, within the main memory 604 or within the processing device 602 during execution thereof by the computer system 600, the main memory 604 and the processing device 602 also constituting machine-readable storage media.

The term "machine-readable storage medium" should be taken to include a single medium or multiple media that store the one or more sets of instructions, or any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media. In an example, a massed machine-readable medium comprises a machine-readable medium with a plurality of particles having invariant (e.g., rest) mass. Accordingly, massed machine-readable media are not transitory propagating signals. Specific examples of massed machine-readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The machine 600 may further include a display unit, an alphanumeric input device (e.g., a keyboard), and a user interface (UI) navigation device (e.g., a mouse). In an example, one or more of the display unit, the input device, or the UI navigation device may be a touch screen display. The machine a signal generation device (e.g., a speaker), or one or more sensors, such as a global positioning system (GPS) sensor, compass, accelerometer, or one or more other sensor. The machine 600 may include an output controller, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The instructions 626 (e.g., software, programs, an operating system (OS), etc.) or other data are stored on the storage system 618 can be accessed by the main memory 604 for use by the processing device 602. The main memory 604 (e.g., DRAM) is typically fast, but volatile, and thus a different type of storage than the storage system 618 (e.g., an SSD), which is suitable for long-term storage, including while in an "off" condition. The instructions 626 or data in use by a user or the machine 600 are typically loaded in the main memory 604 for use by the processing device 602. When the main memory 604 is full, virtual space from the storage system 618 can be allocated to supplement the main memory 604; however, because the storage system 618 device is typically slower than the main memory 604, and write speeds are typically at least twice as slow as read speeds, use of virtual memory can greatly reduce user experience due to storage system latency (in contrast to the main memory 604, e.g., DRAM). Further, use of the storage system 618 for virtual memory can greatly reduce the usable lifespan of the storage system 618.

The instructions 624 may further be transmitted or received over a network 620 using a transmission medium via the network interface device 608 utilizing any one of a number of transfer protocols (e.g., frame relay, Internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (EEE) 802.11 family of standards known as Wi-Fi®, IEEE 802.16 family of standards known as WiMax®), IEEE 802.15.4 family of standards, peer-to-peer (P2P) networks, among others. In an example, the network interface device 608 may include one or more physical jacks (e.g., Ethernet, coaxial, or phone jacks) or one or more antennas to connect to the network 620. In an example, the network interface device 608 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding, or carrying instructions for execution by the machine 600, and includes digital or analog communications signals or other intangible medium to facilitate communication of such software.

The above detailed description includes references to the accompanying drawings, which form a part of the detailed description. The drawings show, by way of illustration, specific embodiments in which the invention can be practiced. These embodiments are also referred to herein as "examples". Such examples can include elements in addition to those shown or described. However, the present inventor also contemplates examples in which only those elements shown or described are provided. Moreover, the present inventor also contemplates examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein". Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

In various examples, the components, controllers, processors, units, engines, or tables described herein can include, among other things, physical circuitry or firmware stored on a physical device. As used herein, "processor" means any type of computational circuit such as, but not limited to, a microprocessor, a microcontroller, a graphics processor, a digital signal processor (DSP), or any other type of processor or processing circuit, including a group of processors or multi-core devices.

The term "horizontal" as used in this document is defined as a plane parallel to the conventional plane or surface of a substrate, such as that underlying a wafer or die, regardless of the actual orientation of the substrate at any point in time. The term "vertical" refers to a direction perpendicular to the horizontal as defined above. Prepositions, such as "on," "over," and "under" are defined with respect to the conventional plane or surface being on the top or exposed surface of the substrate, regardless of the orientation of the substrate; and while "on" is intended to suggest a direct contact of one structure relative to another structure which it lies "on" (in the absence of an express indication to the contrary); the terms "over" and "under" are expressly intended to identify a relative placement of structures (or layers, features, etc.), which expressly includes—but is not limited to—direct contact between the identified structures unless specifically identified as such. Similarly, the terms "over" and "under" are not limited to horizontal orientations, as a structure may be "over" a referenced structure if it is, at some point in time, an outermost portion of the construction under discussion, even if such structure extends vertically relative to the referenced structure, rather than in a horizontal orientation.

The terms "wafer" and "substrate" are used herein to refer generally to any structure on which integrated circuits are formed, and also to such structures during various stages of integrated circuit fabrication. The following detailed description is, therefore, not to be taken in a limiting sense, and the scope of the various embodiments is defined only by the appended claims, along with the full scope of equivalents to which such claims are entitled.

Various embodiments according to the present disclosure and described herein include memory utilizing a vertical structure of memory cells (e.g., NAND strings of memory cells). As used herein, directional adjectives will be taken relative a surface of a substrate upon which the memory cells are formed (i.e., a vertical structure will be taken as extending away from the substrate surface, a bottom end of the vertical structure will be taken as the end nearest the substrate surface and a top end of the vertical structure will be taken as the end farthest from the substrate surface).

As used herein, directional adjectives, such as horizontal, vertical, normal, parallel, perpendicular, etc., can refer to relative orientations, and are not intended to require strict adherence to specific geometric properties, unless otherwise noted. For example, as used herein, a vertical structure need not be strictly perpendicular to a surface of a substrate, but may instead be generally perpendicular to the surface of the substrate, and may form an acute angle with the surface of the substrate (e.g., between 60 and 120 degrees, etc.).

In some embodiments described herein, different doping configurations may be applied to a select gate source (SGS), a control gate (CG), and a select gate drain (SGD), each of which, in this example, may be formed of or at least include polysilicon, with the result such that these tiers (e.g., polysilicon, etc.) may have different etch rates when exposed to an etching solution. For example, in a process of forming a monolithic pillar in a 3D semiconductor device, the SGS and the CG may form recesses, while the SGD may remain less recessed or even not recessed. These doping configurations may thus enable selective etching into the distinct tiers (e.g., SGS, CG, and SGD) in the 3D semiconductor device by using an etching solution (e.g., tetramethylammonium hydroxide (TMCH)).

Operating a memory cell, as used herein, includes reading from, writing to, or erasing the memory cell. The operation of placing a memory cell in an intended state is referred to herein as "programming," and can include both writing to or erasing from the memory cell (i.e., the memory cell may be programmed to an erased state).

According to one or more embodiments of the present disclosure, a memory controller (e.g., a processor, controller, firmware, etc.) located internal or external to a memory device, is capable of determining (e.g., selecting, setting, adjusting, computing, changing, clearing, communicating, adapting, deriving, defining, utilizing, modifying, applying, etc.) a quantity of wear cycles, or a wear state (e.g., recording wear cycles, counting operations of the memory device as they occur, tracking the operations of the memory device it initiates, evaluating the memory device characteristics corresponding to a wear state, etc.)

According to one or more embodiments of the present disclosure, a memory access device may be configured to provide wear cycle information to the memory device with each memory operation. The memory device control circuitry (e.g., control logic) may be programmed to compensate for memory device performance changes corresponding to the wear cycle information. The memory device may receive the wear cycle information and determine one or more operating parameters (e.g., a value, characteristic) in response to the wear cycle information.

It will be understood that when an element is referred to as being "on," "connected to" or "coupled with" another element, it can be directly on, connected, or coupled with the other element or intervening elements may be present. In contrast, when an element is referred to as being "directly on," "directly connected to" or "directly coupled with" another element, there are no intervening elements or layers present. If two elements are shown in the drawings with a line connecting them, the two elements can be either be coupled, or directly coupled, unless otherwise indicated.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, the code can be tangibly stored on one or more volatile or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

Example 1 is a host system comprising: a host device comprising a host processor; a storage system comprising at least one non-volatile memory device and control circuitry coupled to the at least one non-volatile memory device; and a communication interface between the host device and the storage system, configured to enable communication between the host device and the storage system, wherein the storage system is configured to receive commands from the host device over the communication interface, wherein the host device is configured to control a power mode of the storage system, the power mode comprising an active power mode, an idle power mode, and a deep idle power mode, wherein the communication interface is configured to be placed in an active state in the active power mode and in a hibernate state in the idle power mode and the deep idle power mode, and wherein, after completing an operation, the control circuitry is configured to transition from the active power mode to the idle power mode, the idle power mode having a first power level and a first exit latency, and In Example 2, the subject matter of Example 1, wherein the power mode further comprises a sleep power mode, wherein, after a second threshold time after entering the deep idle power mode, the control circuitry is configured to transition from the deep idle power mode to the sleep power mode, the sleep power mode having a third power level lower than the second power level and a third exit latency higher than the second exit latency, and wherein the first, second, and third exit latencies include a time required to transition to the active power mode from the idle power mode, deep idle power mode, and sleep power mode, respectively.

In Example 3, the subject matter of Example 2, wherein the host device is configured to retain VCC to the storage system in the deep idle power mode, and to disable VCC to the storage system in the sleep power mode.

In Example 4, the subject matter of any of Examples 2-3, wherein the control circuitry is configured to transition from the active power mode to the idle power mode after completing all pending operations, and wherein the second threshold time is at least an order of magnitude larger than the first threshold time and the third exit latency is at least an order of magnitude larger than the second exit latency.

In Example 5, the subject matter of any of Examples 1-4, wherein the second exit latency is at least an order of magnitude larger than the first exit latency and the second power level is lower than the first power level by at least an order of magnitude, and wherein the first power level comprises a first current limit and the second power level comprises a second current limit.

In Example 6, the subject matter of any of Examples 1-5, comprising: a unidirectional power state signal interface, separate from the communication interface, configured to provide an indication to the host device that the storage system is ready to enter a power savings power mode, wherein the host device is configured to remove VCC from the storage system in response to the provided indication.

Example 7 is an apparatus comprising: a storage system comprising at least one non-volatile memory device, control circuitry coupled to the at least one non-volatile memory device, and interface circuitry configured to receive commands from a host device, wherein, after completing an operation, the control circuitry is configured to transition from an active power mode to an idle power mode, the idle power mode having a first power level and a first exit latency, and wherein, after a first threshold time after entering the idle power mode without receiving a command from the host device, the control circuitry is configured to move host data stored in volatile memory of the storage system to non-volatile memory of the storage system and transition to a deep idle power mode, the deep idle power mode having a second power level lower than the first power level and a second latency higher than the first latency.

In Example 8, the subject matter of Example 7, wherein the interface circuitry is configured to be placed in an active state in the active power mode and in a hibernate state in the idle power mode and the deep idle power mode.

In Example 9, the subject matter of any of Examples 7-8, wherein, after a second threshold time after entering the deep idle power mode, the control circuitry is configured to transition from the deep idle power mode to a sleep power mode, the sleep power mode having a third power level lower than the second power level and a third exit latency higher than the second exit latency, and wherein the first, second, and third exit latencies include a time required to transition to the active power mode from the idle power mode, deep idle power mode, and sleep power mode, respectively.

In Example 10, the subject matter of Example 9, wherein VCC is maintained in the storage system in the deep idle power mode and disabled in the storage system in the sleep power mode.

In Example 11, the subject matter of any of Examples 9-10, wherein the control circuitry is configured to transition from the active power mode to the idle power mode after completing all pending operations, and wherein the second threshold time is at least an order of magnitude larger than the first threshold time and the third exit latency is at least an order of magnitude larger than the second exit latency.

In Example 12, the subject matter of any of Examples 7-11, wherein the second exit latency is at least an order of magnitude larger than the first exit latency and the second power level is lower than the first power level by at least an order of magnitude, and wherein the first power level comprises a first current limit and the second power level comprises a second current limit.

In Example 13, the subject matter of any of Examples 7-12, comprising: a unidirectional power state signal interface, separate from the interface circuitry, configured to provide an indication to the host device that the storage system is ready to enter a power savings power mode, having stored host data in non-volatile memory.

Example 14 is a method comprising: receiving commands at a storage system from a host device using interface circuitry of the storage system, the storage system comprising at least one non-volatile memory device and control circuitry coupled to the at least one non-volatile memory device; after completion of an operation, transitioning, using the control circuitry, the power mode of the storage system from an active power mode to an idle power mode, the idle power mode having a first power level and a first exit latency; and after a first threshold time after entering the idle power mode without receiving a command from the host device, moving host data stored in volatile memory of the storage system to non-volatile memory of the storage system and transitioning the power mode of the storage system from the idle power mode to the deep idle power mode using the control circuitry of the storage system, the deep idle power mode having a second power level lower than the first power level and a second exit latency higher than the first latency.

In Example 15, the subject matter of Example 14, comprising: controlling, using the host device, a power mode of the storage system over a communication interface between the host device and the storage system; and controlling a state of the communication interface, comprising placing the communication interface in an active state in the active power mode and in a hibernate state in the idle power mode and the deep idle power mode.

In Example 16, the subject matter of Example 15, comprising: determining, using the control circuitry of the storage system, that the storage system is ready to enter a power savings power mode, having stored host data from volatile memory to non-volatile memory of the storage system; providing, using a unidirectional power state signal interface separate from the communication interface, an indication to the host device that the storage system is ready to enter a power savings power mode using the determination; and removing, using the host device, VCC from the storage system in response to the provided indication.

In Example 17, the subject matter of any of Examples 14-16, after a second threshold time after entering the deep idle power mode, transitioning, using the control circuitry, the storage system from the deep idle power mode to a sleep power mode, the sleep power mode having a third power level lower than the second power level and a third exit latency higher than the second exit latency, wherein the first, second, and third exit latencies include a time required to transition to the active power mode from the idle power mode, deep idle power mode, and sleep power mode, respectively.

In Example 18, the subject matter of Example 17, comprising: maintaining VCC in the storage system in the deep idle power mode; and disabling VCC in the storage system in the sleep power mode.

In Example 19, the subject matter of any of Examples 17-18, comprising: transitioning, using the control circuitry, the storage system from the active power mode to the idle power mode after completing all pending operations, wherein the second threshold time is at least an order of magnitude larger than the first threshold time and the third exit latency is at least an order of magnitude larger than the second exit latency.

In Example 20, the subject matter of any of Examples 14-19, wherein the second exit latency is at least an order of magnitude larger than the first exit latency and the second power level is lower than the first power level by at least an order of magnitude, and wherein the first power level comprises a first current limit and the second power level comprises a second current limit.

Example 21 is at least one non-transitory computer-readable storage medium comprising instructions that, when executed by control circuitry of a storage system, cause the control circuitry to: receive commands at the storage system from a host device using interface circuitry of the storage system, the storage system comprising at least one non-volatile memory device; after completion of an operation, transition the power mode of the storage system from an active power mode to an idle power mode, the idle power mode having a first power level and a first exit latency; and after a first threshold time after entering the idle power mode without receiving a command from the host device: move host data stored in volatile memory of the storage system to non-volatile memory of the storage system; and transition the power mode of the storage system from the idle power mode to the deep idle power mode, the deep idle power mode having a second power level lower than the first power level and a second exit latency higher than the first latency.

In Example 22, the subject matter of Example 21, wherein the instructions cause the control circuitry to: determine that the storage system is ready to enter a power savings power mode, having stored host data from volatile memory to non-volatile memory of the storage system, provide, using a unidirectional power state signal interface separate from the communication interface, an indication to the host device that the storage system is ready to enter a power savings power mode using the determination.

In Example 23, the subject matter of any of Examples 21-22, wherein the instructions cause the control circuitry to: after a second threshold time after entering the deep idle power mode, transition the storage system from the deep idle power mode to a sleep power mode, the sleep power mode having a third power level lower than the second power level and a third exit latency higher than the second exit latency, wherein the first, second, and third exit latencies include a time required to transition to the active power mode from the idle power mode, deep idle power mode, and sleep power mode, respectively.

In Example 24, the subject matter of Example 23, wherein the instructions cause the control circuitry to: maintain VCC in the storage system in the deep idle power mode; and disable VCC in the storage system in the sleep power mode.

In Example 25, the subject matter of any of Examples 23-24, wherein the instructions cause the control circuitry to: transition the storage system from the active power mode to the idle power mode after completing all pending operations, wherein the second threshold time is at least an order of magnitude larger than the first threshold time and the third exit latency is at least an order of magnitude larger than the second exit latency.

In Example 26, the subject matter of any of Examples 21-25, wherein the second exit latency is at least an order of magnitude larger than the first exit latency and the second power level is lower than the first power level by at least an order of magnitude, and wherein the first power level comprises a first current limit and the second power level comprises a second current limit.

In Example 27, subject matter (e.g., a system or apparatus) may optionally combine any portion or combination of any portion of any one or more of Examples 1-26 to comprise "means for" performing any portion of any one or more of the functions or methods of Examples 1-26, or at least one "non-transitory machine-readable medium" including instructions that, when performed by a machine, cause the machine to perform any portion of any one or more of the functions or methods of Examples 1-26.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

What is claimed is:

1. A host system comprising:
a host device comprising a host processor;
a storage system comprising at least one non-volatile memory device and control circuitry coupled to the at least, one non-volatile memory device; and
a communication interlace between the host device and the storage system, configured to enable communication between the host device and the storage system,
wherein the storage system is configured to receive commands from the host device over the communication interface,
wherein the host device is configured to control a power mode of the storage system, the power mode comprising an active power mode, an idle power mode, and a deep idle power mode, wherein the communication interface is configured to be placed in an active state in the active power mode and in a hibernate state in the idle power mode and the deep idle power mode, and
wherein, after completing an operation, the control circuitry is configured to transition from the active power mode to the idle power mode, the idle power mode having a first power level and a first exit latency, and
wherein, after a first threshold time after entering the idle power mode, the control circuitry, is configured to move host data stored in volatile memory of the storage system to non-volatile memory of the storage system and transition to the deep idle power mode, the deep idle power mode having a second power level lower than the first power level and a second exit latency higher than the first latency.

2. The host system of claim 1,
wherein the power mode further comprises a sleep power mode,
wherein, after a second threshold time after entering the deep idle power mode, the control circuitry is configured to transition from the deep idle power mode to the sleep power mode, the sleep power mode having a third power level lower than the second power level and a third exit latency higher than the second exit latency, and
wherein the first, second, and third exit latencies include a time required to transition to the active power mode from the idle power mode, deep idle power mode, and sleep power mode, respectively.

3. The host system of claim 2,
wherein the host device is configured to retain VCC to the storage system in the deep idle power mode, and to disable VCC to the storage system in the sleep power mode.

4. The host system of claim 2,
wherein the control circuitry is configured to transition from the active power mode to the idle power mode after completing all pending operations, and
wherein the second threshold time is at least an order of magnitude larger than the first threshold time and the third exit latency is at least an order of magnitude larger than the second exit latency.

5. The host system of claim 1,
wherein the second exit latency is at least an order of magnitude larger than the first exit latency and the second power level is lower than the first power level by at least an order of magnitude, and
wherein the first power level comprises a first current limit and the second power level comprises a second current limit.

6. The host system of claim 1, comprising:
a unidirectional power state signal interface, separate from the communication interface, configured to provide an indication to the host device that the storage system is ready to enter a power savings power mode,
wherein the host device is configured to remove VCC from the storage system in response to the provided indication.

7. The host system of claim 1, wherein the power mode comprises:
the active power mode having an active power level;
the idle power mode having the first power level lower than the active power level and the first exit latency to return to the active power mode;
the deep idle power mode having the second power level lower than the first power level and the second exit latency to return to the active power mode higher than the first latency;
a sleep power mode having a third power level lower than the second power level and a third exit latency to return to the active power mode higher than the second exit latency; and
a powerdown power mode having a fourth power level lower than the third power level,
wherein the deep idle power mode is a different power mode than the sleep power mode,
wherein the powerdown power mode is different than the sleep power mode,
wherein VCC is maintained in the storage system in the deep idle power mode and disabled in the storage system in the sleep power mode, and
wherein at least one of VCCQ or VCCQ2, different than VCC, is maintained in the storage system in the deep idle power mode and the sleep power mode.

8. An apparatus comprising:
a storage system comprising at least one non-volatile memory device, control circuitry coupled to the at least one non-volatile memory device, and interface circuitry configured to receive commands from a host device,
wherein, after completing an operation, the control circuitry is configured to transition from an active power mode to an idle power mode, the idle power mode having a first power level and a first exit latency, and
wherein, after a first threshold time after entering the idle power mode without, receiving a command from the host device, the control circuitry is configured to move host data stored in volatile memory of the storage system to non-volatile memory of the storage system and transition to a deep idle power mode, the deep idle power mode having a second power level lower than the first power level and a second latency higher than the first latency.

9. The apparatus of claim 8,
wherein the interface circuitry is configured to be placed in an active state in the active power mode and in a hibernate state in the idle power mode and the deep idle power mode.

10. The apparatus of claim 8,
wherein, after a second threshold time after entering the deep idle power mode, the control circuitry is configured to transition from the deep idle power mode to a sleep power mode, the sleep power mode having a third power level lower than the second power level and a third exit latency higher than the second exit latency, and
wherein the first, second, and third exit latencies include a time required to transition to the active power mode from the idle power mode, deep idle power mode, and sleep power mode, respectively.

11. The apparatus of claim 10,
wherein VCC is maintained in the storage system in the deep idle power mode and disabled in the storage system in the sleep power mode.

12. The apparatus of claim 10,
wherein the control circuitry is configured to transition from the active power mode to the idle power mode after completing all pending operations, and
wherein the second threshold time is at least an order of magnitude larger than the first threshold time and the third exit latency is at least an order of magnitude larger than the second exit latency.

13. The apparatus of claim 8,
wherein the second exit latency is at least an order of magnitude larger than the first exit latency and the second power level is lower than the first power level by at least an order of magnitude, and
wherein the first power level comprises a first current limit and the second power level comprises a second current limit.

14. The apparatus of claim 8, comprising:
a unidirectional power state signal interface, separate from the interface circuitry, configured to provide an indication to the host device that the storage system is ready to enter a power savings power mode, having stored host data in non-volatile memory.

15. A method comprising:
receiving commands at a storage system from a host device using interface circuitry of the storage system, the storage system comprising at least one non-volatile memory device and control circuitry coupled to the at least one non-volatile memory device;
after completion of an operation, transitioning, using the control circuitry, the power mode of the storage system from an active power mode to an idle power mode, the idle power mode having a first power level and a first exit latency; and
after a first threshold time after entering the idle power mode without receiving a command from the host device, moving host data stored in volatile memory of the storage system to non-volatile memory of the storage system and transitioning the power mode of the storage system from the idle power mode to the deep idle power mode using the control circuitry of the storage system, the deep idle power mode having a second power level lower than the first power level and a second exit latency higher than the first latency.

16. The method of claim 15, comprising:
controlling, using the host device, a power mode of the storage system over a communication interface between the host device and the storage system; and
controlling a state of the communication interface, comprising placing the communication interface in an active state in the active power mode and in a hibernate state in the idle power mode and the deep idle power mode.

17. The method of claim 16, comprising:
determining, using the control circuitry of the storage system, that the storage system is ready to enter a power savings power mode, having stored host data from volatile memory to non-volatile memory of the storage system;
providing, using a unidirectional power state signal interface separate from the communication interface, an indication to the host device that the storage system is ready to enter a power savings power mode using the determination; and
removing, using the host device, VCC from the storage system in response to the provided indication.

18. The method of claim 15,
after a second threshold time after entering the deep idle power mode, transitioning, using the control circuitry, the storage system from the deep idle power mode to a sleep power mode, the sleep power mode having a third power level lower than the second power level and a third exit latency higher than the second exit latency,
wherein the first, second, and third exit latencies include a time required to transition to the active power mode from the idle power mode, deep idle power mode, and sleep power mode, respectively.

19. The method of claim 18, comprising:
maintaining VCC in the storage system in the deep idle power mode; and
disabling VCC in the storage system in the sleep power mode.

20. The method of claim 18, comprising:
transitioning, using the control circuitry, the storage system from the active power mode to the idle power mode after completing all pending operations,
wherein the second threshold time is at least an order of magnitude larger than the first threshold time and the third exit latency is at, least, an order of magnitude larger than the second exit latency.

21. The method of claim 15,
wherein the second exit latency is at east an order of magnitude larger than the first exit latency and the second power level is lower than the first power level by at least an order of magnitude, and wherein the first power level comprises a first current limit and the second power level comprises a second current limit.

22. At least one non transitory computer-readable storage medium comprising instructions that, when executed by control circuitry of a storage system, cause the control circuitry to:
  receive commands at the storage system from a host device using interface circuitry of the storage system, the storage system comprising at least one non-volatile memory device;
  after completion of an operation, transition the power mode of the storage system from an active power mode to an idle power mode, the idle power mode having a first power level and a first exit latency; and
  after a first threshold time after entering the idle power mode without receiving a command from the host device:
    move host data stored in volatile memory of the storage system to non-volatile memory of the storage system; and
    transition the power mode of the storage system from the idle power mode to the deep idle power mode, the deep idle power mode having a second power level lower than the first, power level and a second exit latency higher than the first latency.

23. The at least one non-transitory computer-readable storage medium of claim 22, wherein the instructions cause the control circuitry to:
  determine that the storage system is ready to enter a power savings power mode, having stored host data from volatile memory to non-volatile memory of the storage system,
  provide, using a unidirectional power state signal interface separate from the communication interface, an indication to the host device that the storage system is ready to enter a power savings power mode using the determination.

24. The at least one non-transitory computer-readable storage medium of claim 22, wherein the instructions cause the control circuitry to:
  after a second threshold time after entering the deep idle power mode, transition the storage system from the deep idle power mode to a sleep power mode, the sleep power mode having a third power level lower than the second power level and a third exit latency higher than the second exit latency,
  wherein the first, second, and third exit latencies include a time required to transition to the active power mode from the idle power mode, deep idle power mode, and sleep power mode, respectively.

25. The at least one non-transitory computer-readable storage medium of claim 24, wherein the instructions cause the control circuitry to:
  maintain VCC in the storage system in the deep idle power mode; and
  disable VCC in the storage system in the sleep power mode.

26. The at least one non-transitory computer-readable storage medium of claim 24, wherein the instructions cause the control circuitry to:
  transition the storage system from the active power mode to the idle power mode after completing all pending operations,
  wherein the second threshold time is at least an order of magnitude larger than the first threshold time and the third exit latency is at least an order of magnitude larger than the second exit latency.

27. The at, least, one non-transitory computer-readable storage medium of claim 22,
  wherein the second exit latency is at least an order of magnitude larger than the first exit latency and the second power level is lower than the first power level by at least an order of magnitude, and
  wherein the first power level comprises a first current limit and the second power level comprises a second current limit.

* * * * *